United States Patent
Decker et al.

(12) United States Patent (10) Patent No.: US 10,612,891 B1
Decker et al. (45) Date of Patent: Apr. 7, 2020

(54) AUTOMATED AMMUNITION PHOTOGRAMMETRY SYSTEM

(71) Applicant: U.S. Government as Represented by the Secretary of the Army, Picatinny Arsenal, Dover, NJ (US)

(72) Inventors: Ryan Decker, Lake Hopatcong, NJ (US); Marco Duca, Mount Arlington, NJ (US); Shawn Spickert-Fulton, Morris Plains, NJ (US); Kyle Schaarschmidt, Bangor, PA (US); Christopher Vesper, Belvidere, NJ (US)

(73) Assignee: The United States of America as Represented by the Secretary of the Army, Washington, DC (US)

(*) Notice: Subject to any disclaimer, the term of this patent is extended or adjusted under 35 U.S.C. 154(b) by 152 days.

(21) Appl. No.: 15/966,255

(22) Filed: Apr. 30, 2018

Related U.S. Application Data

(60) Provisional application No. 62/491,531, filed on Apr. 28, 2017.

(51) Int. Cl.
| | |
|---|---|
| F41G 3/32 | (2006.01) |
| G06T 7/12 | (2017.01) |
| G06T 7/593 | (2017.01) |
| F41A 31/00 | (2006.01) |
| F41A 3/08 | (2006.01) |
| F41G 3/08 | (2006.01) |
| G01P 3/68 | (2006.01) |

(52) U.S. Cl.
CPC ............ *F41G 3/32* (2013.01); *F41A 31/00* (2013.01); *F41G 3/08* (2013.01); *G01P 3/685* (2013.01); *G06T 7/12* (2017.01); *G06T 7/593* (2017.01)

(58) Field of Classification Search
None
See application file for complete search history.

(56) References Cited

U.S. PATENT DOCUMENTS

| 8,651,381 | B2 | 2/2014 | Rudich | |
| 9,010,002 | B2* | 4/2015 | Popa-Simil | F41C 27/22 42/1.06 |
| 9,721,352 | B1* | 8/2017 | Yakimenko | G06T 7/2033 |
| 9,911,046 | B1* | 3/2018 | Yakimenko | G06K 9/00744 |
| 10,163,221 | B1* | 12/2018 | Decker | G06T 7/12 |
| 2009/0040308 | A1 | 2/2009 | Temovskiy | |
| 2011/0297742 | A1 | 12/2011 | Sullivan | |

* cited by examiner

Primary Examiner — Natalie Huls
Assistant Examiner — Jermaine L Jenkins
(74) Attorney, Agent, or Firm — John P. DiScala

(57) ABSTRACT

The impact angle of a small caliber projectile is determined by accurately measuring the orientation angle of the projectile in flight and modeling epicyclical flight of the projectile. To measure the orientation angle, a projectile is fired along a trajectory within a test gantry. One or more sets of cameras captures images of the projectile in flight. The images are processed using computer vision to measure the position and orientation angle at each station. Calibration of the test equipment prior to the test firing of the projectile, allows for determination of these points in the 3d space of the test fixture. Aeroballistic models are fit to the orientation history. From these models, an impact angle is extrapolated.

20 Claims, 17 Drawing Sheets

AUTOMATED AMMUNITION PHOTOGRAMMETRY SYSTEM

CROSS-REFERENCE TO RELATED APPLICATIONS

This application claims the benefit under 35 USC § 119(e) of U.S. provisional patent application 62/491,531 filed on Apr. 28, 2017.

STATEMENT OF GOVERNMENT INTEREST

The inventions described herein may be manufactured, used and licensed by or for the United States Government.

BACKGROUND OF THE INVENTION

The invention relates in general to weapon systems and in particular to testing systems for weapon systems.

Upon impact with a target, a projectile's terminal ballistic performance is highly dependent on numerous factors. These include: impact velocity, bullet orientation, bullet construction, target composition, target orientation and test geometry. Target orientation, target composition, and test geometry are easily controlled for during tests. Additionally, there are established methods for determining impact velocity which have been employed with great accuracy. However, it is a challenge to measure the orientation of the bullet during tests.

Bullet orientation includes both angle of obliquity and angle of attack (AoA). Angle of obliquity is the angular difference between the normal vector of the target surface and the velocity vector of the incoming projectile. During testing, the angle of obliquity can be controlled by orienting the target surface to be normal to the bullet trajectory at impact location.

AoA, however, cannot be controlled for during testing and must be determined. A projectile's AoA is the angular difference between the projectile's velocity vector and its longitudinal axis, also known as pointing direction. During flight, the longitudinal axis of an axially-symmetric spin-stabilized projectile rotates around its velocity vector in a profile known as epicyclic motion. When evaluating a projectile's impact effects on a target, the AoA is of particular importance because low AoA values indicate improved penetration performance.

While methods for measuring the AoA of a small caliber projectile exist, these conventional methods are inadequate as they are either inaccurate, costly or time consuming. Yaw cards are one approach that has been used to measure AoA. Yaw cards made from plastic paper or cardboard-like materials are placed at various locations along a bullet trajectory. The shape of the hole made in the card after the bullet passes through is then compared to a baseline to estimate the orientation angle at that location. These estimates are crude in precision, especially for small caliber projectiles. The setup and post-processing of yaw cards is often exhaustive. Additionally, new cards are needed for each test. In some test situations it may not be possible to place yaw cards at the point of impact because damage from spalled components may affect the shape of the hole.

Another common approach involves the use of "pitch and yaw" high speed video cameras. In such a method, camera systems are placed at the target location to record images of bullets before impact. The setup of these system along with illuminating bulbs can be exhaustive. Following a test, the results are usually analyzed manually by an operator clicking on various points of the projectile. This type of analysis can typically take days, if not weeks, of data reduction and it is difficult to verify the accuracy of the results. Additionally, because of spalling at impact, these expensive camera systems must be shielded using thick bullet-proof glass which can hinder results and further complicate setup.

More sophisticated methods of orientation measurement include shadowgraphs and radiographs. These images are generated by short duration pulses of light or x-rays which are similar to photographs. These images are collected between tests, digitized and the processed relative to template or background fiducial to develop orientation and position histories at each station. While these methods have been found to be accurate, the time required for analysis can be significant because of manual data and digitization.

Therefore a need exists for a system and method for determining the impact angle of a small caliber projectile that is both efficient and effective.

SUMMARY OF INVENTION

One aspect of the invention is method for determining the impact angle of a small caliber projectile. The system method includes the steps of: calibrating a test system; conducting a test firing of a projectile; measuring an orientation angle of the test projectile; fitting an aeroballistic model to the test projectile; and determining an impact angle of the projectile. The test system comprises a gantry defining an interior volume which comprises a test projectile line of fire, at least one pair of cameras mounted to the gantry having a field of view at an orthogonal angle relative to each other and comprising a portion of the test projectile line of fire, and a removable calibration bar holding a calibration plate in the field of view of each pair of the at least one pair of cameras.

Another aspect of the invention is a test system for determining the impact angle of a small caliber projectile. The test system includes a gantry, at least one pair of cameras mounted to the gantry, a removable calibration bar, a memory encoding one or more processor-executable instructions and a processor. The gantry has surveyed points and defines an interior volume which comprises a test projectile line of fire. The at least one pair of cameras have a field of view at an orthogonal angle relative to each other and comprise a portion of the test projectile line of fire. The removable calibration bar holds a calibration plate in the field of view of each pair of the at least one pair of cameras. The processor is configured to load the one or more processor-executable instructions when encoded from the memory wherein the one or more processor-executable instructions when executed by the processor, cause acts to be performed comprising determining an orientation angle of the projectile, applying an epicyclical model to the projectile and determining an impact angle of the projectile.

The invention will be better understood, and further objects, features and advantages of the invention will become more apparent from the following description, taken in conjunction with the accompanying drawings.

BRIEF DESCRIPTION OF THE DRAWINGS

In the drawings, which are not necessarily to scale, like or corresponding parts are denoted by like or corresponding reference numerals.

DETAILED DESCRIPTION

The impact angle of a small caliber projectile is determined by accurately measuring the orientation angle of the projectile in flight and modeling epicyclical flight of the projectile. To measure the orientation angle, a projectile is fired along a trajectory within a test gantry. One or more sets of cameras captures images of the projectile in flight. The images are processed using computer vision to measure the position and orientation angle at each station. Calibration of the test equipment prior to the test firing of the projectile, allows for determination of these points in the 3d space of the test fixture. Aeroballistic models are fit to the orientation history. From these models, an impact angle is extrapolated.

Advantageously, the system and method described herein are both more accurate and less time consuming in comparison to conventional methods. Prove out demonstrations testing a 5.56 mm ball round have shown that the impact-angle prediction capability is less than six hundredths of a degree.

Analysis results are fairly immediate and may be reviewed during testing. Testing has shown that by utilizing the system and methods described herein, an impact angle may be determined within moments of a test firing in comparison to the often days or weeks of conventional methods. Accordingly, the system described herein is a low cost option for small caliber testing compared to conventional methods which require extensive manual setup and post-processing.

The modular nature and expandability of the system allows for multiple gantries to easily be employed together in a customizable system. Increasing the number of measurement stations allows for complete aerodynamic characterization of ammunition that can be conducted on-site in a precise and automated manner. While the system is described throughout as comprising a single gantry, multiple gantries may be employed at various stages of the projectile trajectory. In one embodiment, multiple gantries are employed to implement a digital spark range.

Further, while the test system is described throughout as a test system for small arms munitions, the system is not limited to small arms munitions or even munitions. The system may be configured to test other munitions such as mortar munition, artillery munitions or rockets or non-munition projectiles.

Figure 1:
FIG. 1 is a left perspective view of a system for determining the orientation angle of a projectile, in accordance with one illustrative embodiment.
Figure 2:
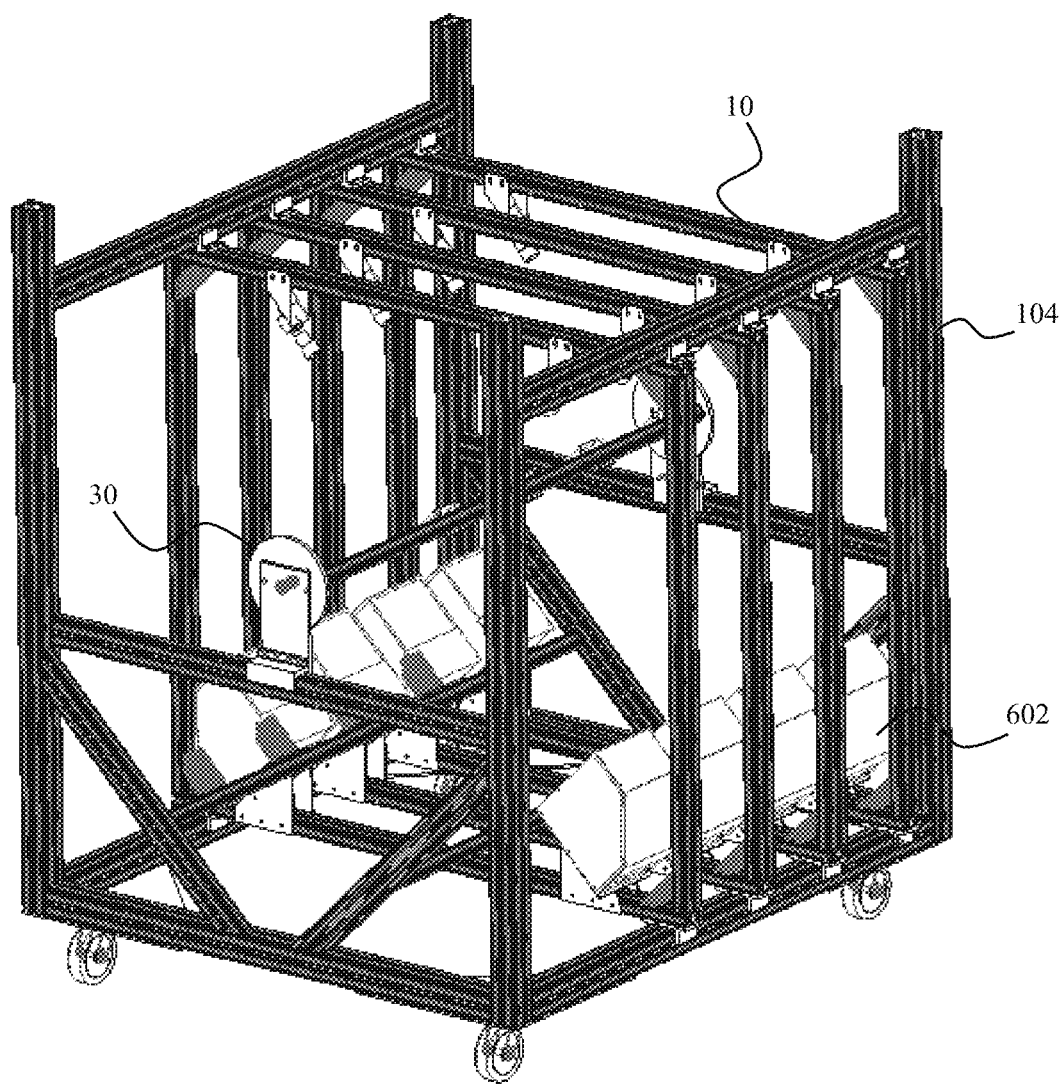
FIG. 2 is a top perspective view of a system for determining the orientation angle of a projectile, in accordance with one illustrative embodiment.

FIG. 1 is a left perspective view of a system for determining the orientation angle of a projectile, in accordance with one illustrative embodiment. FIG. 2 is a top perspective view of a system for determining the orientation angle of a projectile, in accordance with one illustrative embodiment. The system comprises a gantry system 10, a camera system 20, a calibration bar 30, a computing device 50 and a timing system 60.

During a test, the gantry system 10 is positioned in the firing range such that the line-of-fire (LOF) of the projectile passes through the gantry system 10. The gantry system 10 provides a physical mounting structure for the camera system 20, calibration bar 30 and portions of the timing system 60.

The timing system further comprises illumination hardware 602 in the form of infrared strobes. A velocity screen (not shown) located uprange of the gantry 10 provides light detection pulses which are utilized by the timing system 60 to sequentially trigger the illumination hardware 602 as a projectile travels downrange. The timing system with illumination hardware, velocity screen may be of the type available from Sydor Technologies of Rochester, N.Y.

The physical structure of the gantry system 10 comprises a rectangular frame 104 having vertical support members, horizontal support members and diagonal support members. The frame 104 defines a passageway that is aligned with the LOF of the projectile such that during testing the projectile passes through the gantry system 10.

Figure 3:
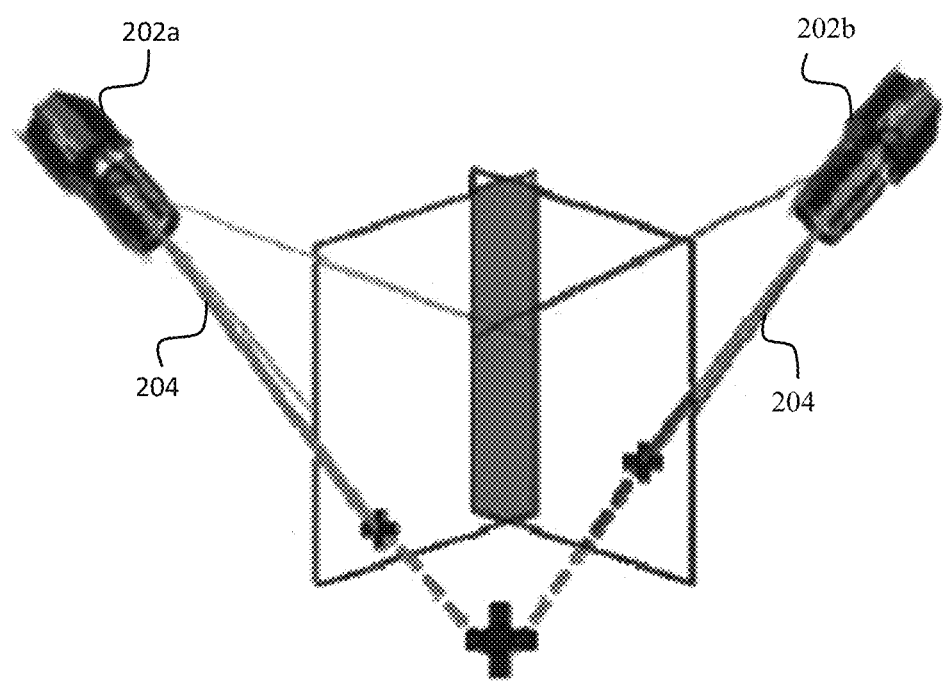
FIG. 3 shows camera positions in the system of FIG. 1, in accordance with one illustrative embodiment.

FIG. 3 shows camera pair positions in the system of FIG. 1, in accordance with one illustrative embodiment. The camera system 20 is mounted to the physical structure of the gantry system 10 such that the camera field of view includes the projectile LOF as it passes through the gantry system 10. The camera system 20 comprises one or more pairs of cameras 202 mounted on the frame 104 of the gantry system 10. For each pair of cameras, a first camera 202a and a second camera 202b are mounted opposite each other on the gantry system 10 and positioned orthogonal to each other such that their line of sights 204 intersect at a right angle.

At each strobe of the timing system 10, each camera 202 records a high resolution grayscale image of the projectile in flight. For example, each camera 202 may be a Prosilica GC 1380 model camera available from Allied Vision of Exton, Pa. The resolution, clarity and focal length of the Prosilica GC 1380 camera is sufficient to allow accurate measurement of the orientation angle of a small caliber projectile. In one embodiment, the Prosilica GC 1380 camera captures images having a resolution of 1360×1024 pixels.

In the embodiment shown in FIG. 1, the camera system 20 comprises four pairs of cameras 202 spaced at predetermined locations within the gantry system 10 along the LOF of the projectile. In other embodiments, the camera system 20 may comprise greater than or less than four pairs of cameras 202. As noted above, as the system may employ more than one gantry system in a modular fashion to increase the accuracy and functionality of the system, similar results may be achieved by employing a greater number of camera pairs.

To determine the impact angle of the projectile under test, the system must be calibrated. The purpose of the calibration process is to develop the critical transforms for each camera system 20 that relate the pixel coordinates of the recorded images to the range coordinate system (R3). The muzzle of the gun firing the test projectile, the target and various extrema points on the gantry system 10 are surveyed to determine their locations in R3. Relationships between each camera 202 and surveyed gantry extrema points are known.

Figure 4:
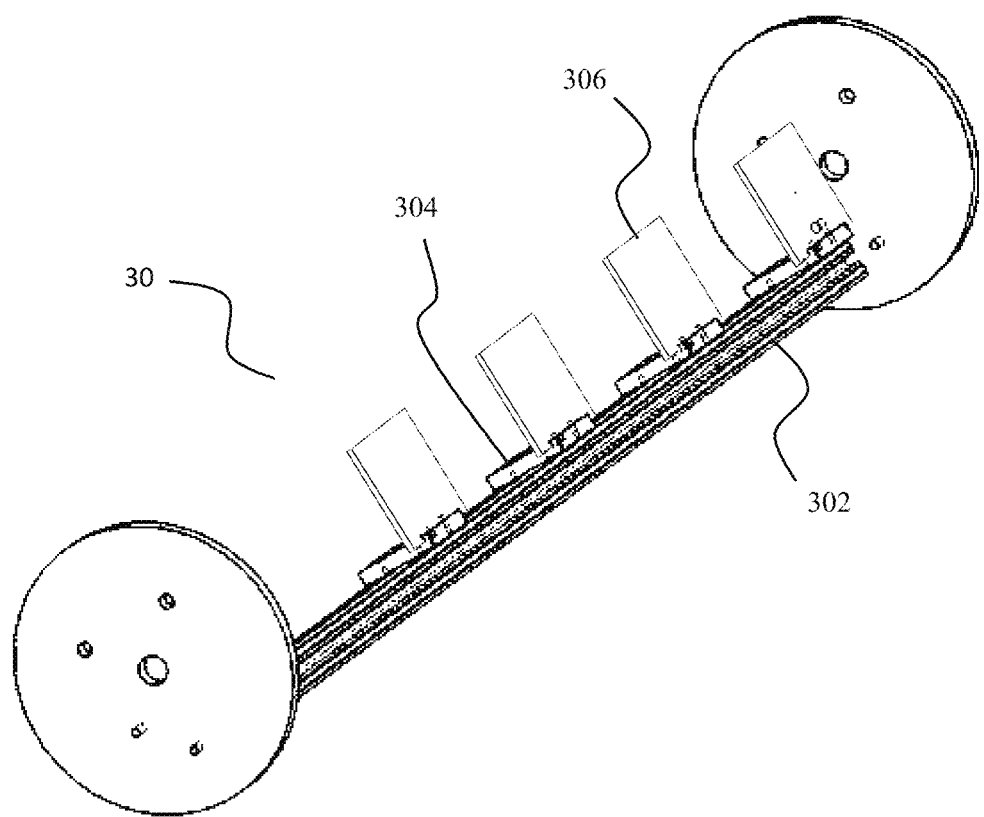
FIG. 4 shows a calibration bar of the system of FIG. 1, in accordance with one illustrative embodiment.

FIG. 4 shows a calibration bar of the system of FIG. 1, in accordance with one illustrative embodiment. A calibration bar 30 is positioned in the gantry system 10 along the LOF of the test projectile. The calibration bar comprises a relatively long cylindrical bar 302 spanning the length of the gantry frame 104 and one or more calibration plates 306, with each calibration plate 306 corresponding to a pair of cameras 202. The calibration plates 306 are mounted to the cylindrical bar 302 by calibration plate mounts 304 which have openings configured to secure the calibration plate 306 at the position and location required for the test system. The calibration bar 30 further comprises mounting surfaces at each end for mounting the calibration bar 20 to the gantry system 10. The mounting surfaces comprise openings for receiving mounting hardware and which are sized and dimensioned to interface with corresponding mounting elements of the calibration bar. 30

The calibration bar 30 is configured such that when inserted into the gantry, the calibration plates 306 are in the field of view of half of the cameras on side of the gantry system 10. More specifically, each calibration plate 306 is in the field of view of one camera from its corresponding camera pair. A calibration image of the calibration plate 306 is taken by each of the cameras with a calibration plate 306 in view. The calibration bar 30 is easily reconfigured such that the calibration plates are in view of the other half of the cameras. The calibration bar 30 is unattached from the gantry system 10 and rotated with respect to the gantry such that the calibration plates 306 are in the field of view of the opposing half of the cameras.

Figure 5:
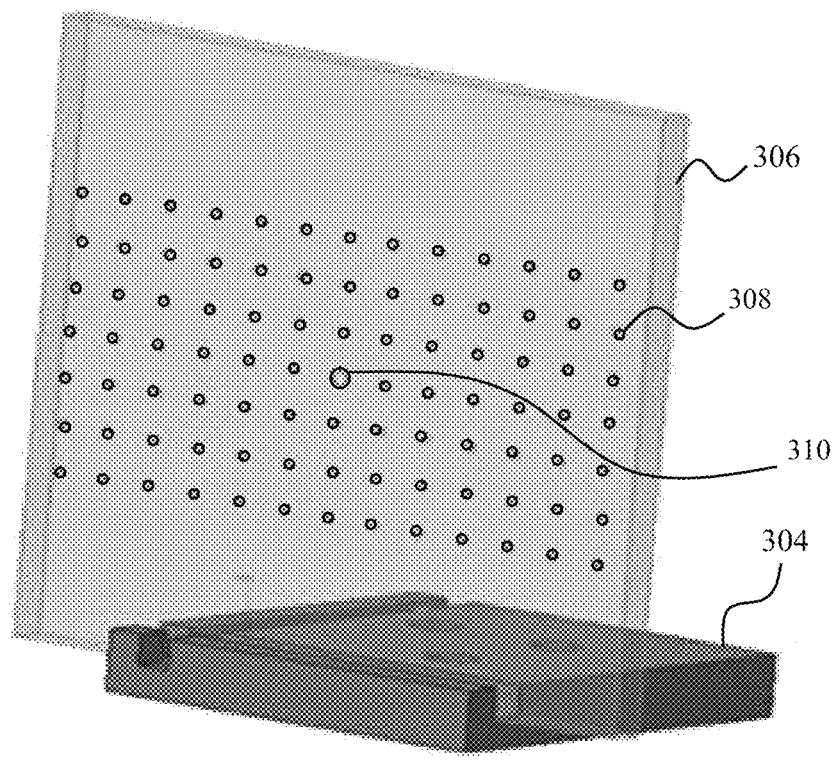
FIG. 5 is a close-up view of a portion of the calibration bar of FIG. 3 showing a calibration plate, in accordance with one illustrative embodiment.

FIG. 5 is a close-up view of a portion of the calibration bar of FIG. 4 showing a calibration plate, in accordance with one illustrative embodiment. The calibration plate 306 is a transparent plastic plate that appears in the field of view of a camera pair 202. The calibration plate 306 contains a matrix of dots 308 that resemble dark circles when illuminated by infrared strobes. One of the dots on the plate 306, a master dot 310, is larger than the other dots which aids in dot position calculation. Extrema points on the calibration bar 30 are surveyed and dot locations are known relative to the extrema points from a-priori calibration with a coordinate measurement accurate to one micrometer. Accordingly, the positions of the dots in R3 are known, as well.

Extrema points on the calibration bar 30 are surveyed to calibrate the test system. These points are known relative to the dot positions. The extrema points are chosen at the extreme edges of the calibration bar to minimize the measurement error in relation to the distances between dot positions and other keypoints. By choosing extrema points on the edges, the relative distance between the extrema points is relatively larger with respect to the measurement error.

With the calibration bar 30 in place, calibration images are recorded for each camera 202. These images are provided to a processor which processes the images according to a Hough Transformation analysis for circles to find the dots in the image. The larger dot on the plate 306 allows a sorting algorithm to identify each individual dot. Knowledge of each found dot and the sub-pixel coordinates of each found dot's center make it possible to compute a transform between image coordinates and R3 within the plane of the calibration plate 306.

Advantageously, camera misalignment, aspect ratio skew and some lens aberrations are automatically corrected for by determining a least squares solution for the 3×3 affine transform and translation vector. Further, spherical aberrations may also be corrected for through pre-calibration of the camera-lens system by using a conventional lens distortion calibration and correction algorithm.

Figure 6:
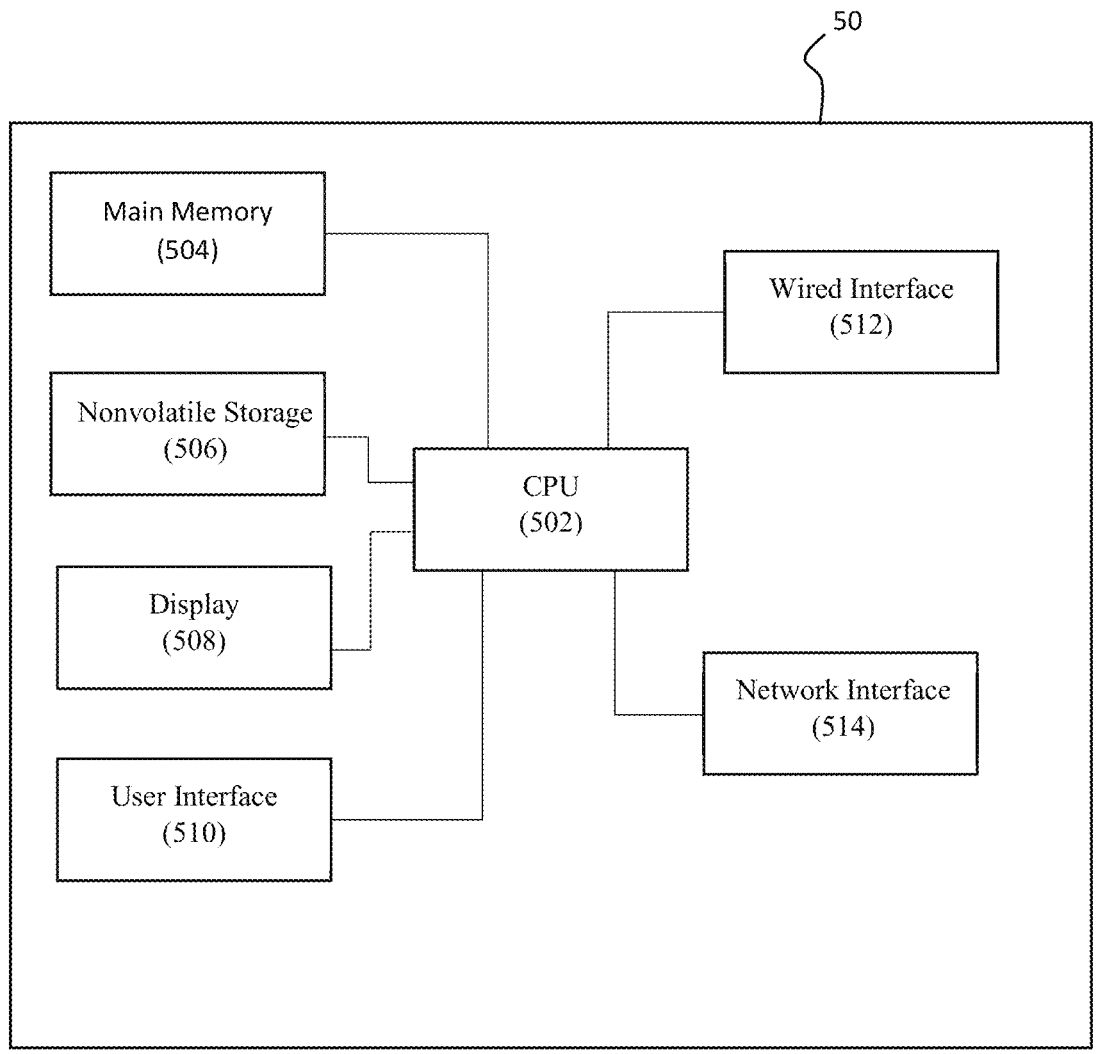
FIG. 6 is a block diagram illustrating a computing device for determining the impact angle of a projectile, in accordance with one illustrative embodiment.

FIG. 6 is a block diagram illustrating a computing device for determining the impact angle of a projectile, in accordance with one illustrative embodiment. The computing device 50 may include at least one central computing device (CPU) 502. For example, the CPU 502 may represent one or more microprocessors, and the microprocessors may be "general purpose" microprocessors, a combination of general and special purpose microprocessors, or application specific integrated circuits (ASICs). Additionally or alternatively, the CPU 502 may include one or more reduced instruction set (RISC) processors, video processors, or related chip sets. The CPU 502 may provide processing capability to execute an operating system, run various applications, and/or provide processing for one or more of the techniques described herein. Applications that may run on the computing device 50 may include, for example software for determining an angle of attack.

A main memory 504 may be communicably coupled to the CPU 502, which may store data and executable code. The main memory 504 may represent volatile memory such as RAM, but may also include nonvolatile memory, such as read-only memory (ROM) or Flash memory. In buffering or caching data related to operations of the CPU 502, the main memory 504 may store data associated with applications running on the computing device 50.

The computing device 50 may also include nonvolatile storage 506. The nonvolatile storage 506 may represent any suitable nonvolatile storage medium, such as a hard disk drive or nonvolatile memory, such as Flash memory. Being well-suited to long-term storage, the nonvolatile storage 506 may store data files, software (e.g., for implementing functions on the computing device 50), It should be appreciated that data associated with determining an angle of attack may be saved in the nonvolatile storage 506. Nonvolatile storage 506 includes one or more software engines operable to enable the determination of an angle of attack. Depending upon implementation, various aspects of teachings of the present invention may be implemented in a single software engine, in a plurality of software engines, in one or more hardwired components or in a combination of hardwired and software systems.

In addition to one or more software engines, nonvolatile storage 506 also includes one or more data storage areas. Data storage area is operably associated with the main memory and CPU 502. Data storage area, or portions thereof, may also be utilized to store myriad other data.

Depending upon implementation, nonvolatile storage 506 may be implemented within the computing device 50, in a storage area network operably coupled to a computing device 50, and/or in other storage media, including removable media, compatible with and accessible by computing device 50.

A display 508 may display images and data for the computing device 50. The display 508 may be any suitable display 508, such as liquid crystal display (LCD), a light emitting diode (LED) based display, an organic light emitting diode (OLED) based display, a cathode ray tube (CRT) display, or an analog or digital television. In some embodiments, the display 508 may function as a touch screen through which a user may interact with the computing device 50.

The computing device 50 may further include a user interface 510. The user interface 510 may represent indicator lights and user input structures, but may also include a graphical user interface (GUI) on the display 508. In practice, the user interface 510 may operate via the CPU 502, using memory from the main memory and long-term storage in the nonvolatile storage. In an embodiment lacking the display 508, indicator lights, sound devices, buttons, and other various input/output (I/O) devices may allow a user to interface with the computing device 50. In an embodiment having a GUI, the user interface 510 may provide interaction with interface elements on the display 508 via certain user input structures, user input peripherals such as a keyboard or mouse, or a touch sensitive implementation of the display 508. The user may interact with the graphic user interface via touch means on a touch screen, input means via one or more keyboard buttons, mouse buttons etc., or voice instructions.

As should be appreciated, one or more applications may be open and accessible to a user via the user interface 510 and displayed on the display 508 of the computing device 50. The applications may run on the CPU 502 in conjunction with the main memory 504, the nonvolatile storage 506, the display 508, and the user interface 510. The applications may run on the CPU 502 in conjunction with the main memory, the nonvolatile storage, the display, and the user interface. As such, it should be appreciated that the instructions for carrying out such techniques on the computing device 50 may represent a standalone application, a function of the operating system of the computing device 50, or a function of the hardware of the CPU 502, the main memory, the nonvolatile storage, or other hardware of the computing device 50.

The computing device 50 may also include a wired input/output (I/O) interface 512 for a wired interconnection between one electronic device and another electronic device. The wired I/O interface 512 may represent, for example, a universal serial bus (USB) port or an IEEE 1394 or FireWire® port, but may also represent a proprietary connection. Additionally, the wired I/O 512 interface may permit a connection to user input peripheral devices, such as a keyboard or a mouse.

One or more network interfaces 514 may provide additional connectivity for the computing device 50. The network interfaces 514 may represent, for example, one or more network interface cards (NIC) or a network controller. In certain embodiments, the network interface 514 may include a personal area network (PAN) interface. The network interface may also include a local area network (LAN) interface. For some embodiments of the computing device 50, the network interfaces 514 may include the capability to connect directly to a wide area network (WAN) via a WAN interface.

Figure 7:
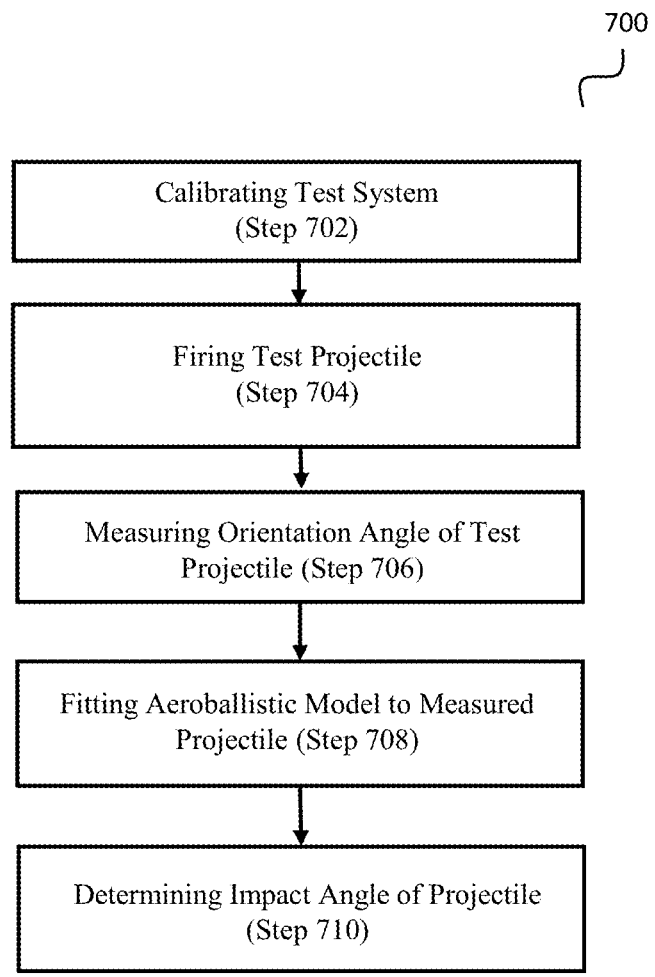
FIG. 7 is a flow diagram illustrating a method of determining the impact angle of a small arms projectile, in accordance with one illustrative embodiment.

FIG. 7 is a flow diagram illustrating a method of determining the impact angle of a small arms projectile, in accordance with one illustrative embodiment. The method 700 for determining the impact angle of a small arms projectile comprises the steps of: calibrating the test system 702, conducting a test firing 704, measuring the orientation angle of the test projectile 706, fitting an aeroballistic model to the measured projectile 708 and determining the impact angle of the projectile 710.

Figure 8:
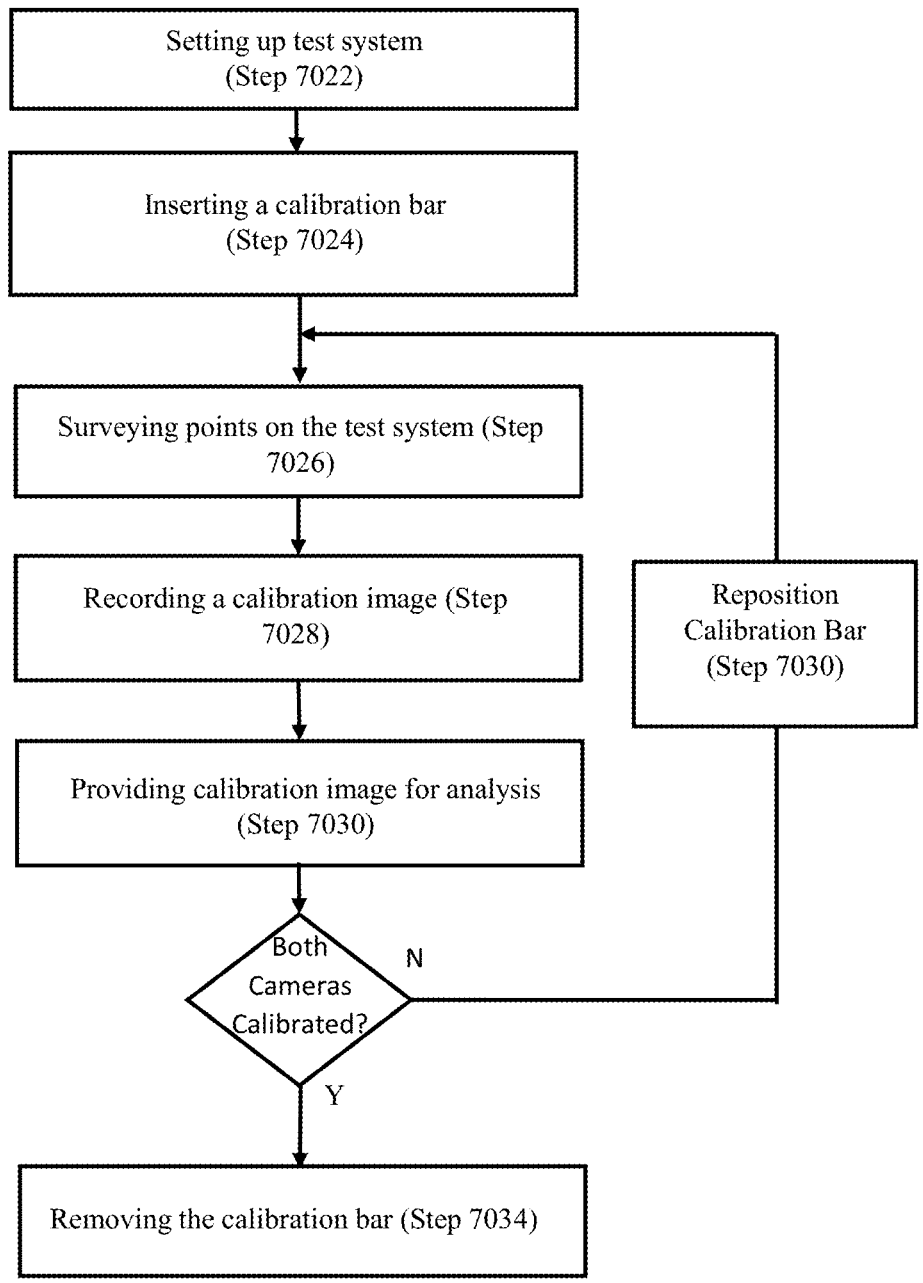
FIG. 8 is a flow diagram illustrating a method of calibrating the test system, in accordance with one illustrative embodiment.

FIG. 8 is a flow diagram illustrating a method of calibrating the test system, in accordance with one illustrative embodiment. The method of calibrating the test system comprises the steps of setting up the test system 7022, inserting a calibration bar 7024, surveying points on the test system 7026, recording one or more calibration images 7028, providing the one or more calibration image to the computing device 50 for analysis 7030 and removing the calibration bar 7032.

At step 7022, the test system is set up. To set up the test system 10, the gantry is positioned in the firing range and aligned such that the LOF of the test projectile is through the central opening of the gantry and within the field of view of the camera system 20. Once in position, the gantry is locked in place.

At step 7024, the calibration bar 30 is positioned in the gantry. The calibration bar 30 is positioned in the gantry such that for each pair of cameras 202 in the camera system 20 there is a calibration plate 306 of the calibration bar 30 in the field of view of one of the cameras. In the embodiment shown in FIG. 1, the calibration bar 30 is positioned so that the calibration plates lie along the line of fire of the bullet and also in the field of view of half of the cameras. Each plate is in the field of view of a single camera.

At step 7026, certain points on the test system are surveyed to establish their position in R3. The muzzle of the gun, the location of the target, extrema points on the gantry system 10 and extrema points on the calibration bar 30 are surveyed. The extrema points on the gantry system 10 which are surveyed include the top right corner, top left corner, middle right, middle left on the face of the gantry downrange and the center of the gantry face uprange. The extrema points on the calibration bar 30 which are surveyed include left, top, and right of downrange face, top and right of uprange face.

At step 7028, calibration images are recorded for each camera 202 in the camera system 20. Each camera 202 records an image of its corresponding calibration plate 306.

At step 7030, after the calibration images are recorded, the calibration bar is repositioned within the gantry system by rotating the calibration bar around its longitudinal axis with respect to the gantry system. The calibration bar is rotated such that the calibration plates are in the field of view of the other half of the cameras. After repositioning the calibration bar, steps 7026-7030 are repeated.

At step 7032, the calibration images are provided to the computing device 50 for analysis. The computing device 50 employs a Hough Transform analysis for circles to find each dot in each image. Since each calibration image comprises one dot which is larger than the other dots in the image, a sorting process identifies each individual dot. Knowledge of the surveyed R3 location of the central dot of each calibration plate 306 and the image pixel coordinates allows for transformation between image coordinates and R3.

The found dot positions in image coordinates are compared to the known dot positions in R3 coordinates from the survey. A least squares approach is used to determine the 3×3 affine transform and translation vector to convert from 2d pixel coordinates to R3 coordinates.

At step 7034, the calibration bar 30 is removed from the gantry system 10.

Figure 9:
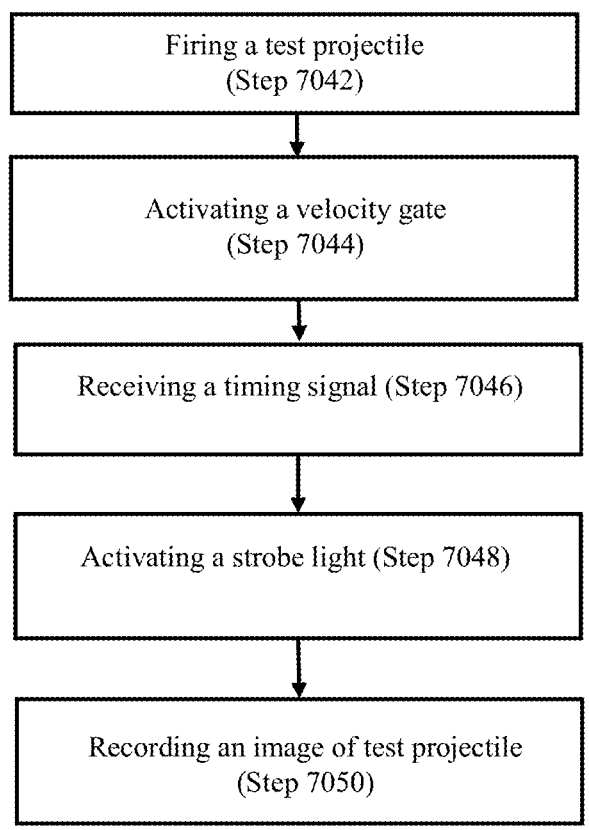
FIG. 9 is a flow diagram illustrating a method of firing a test projectile, in accordance with one illustrative embodiment.

FIG. 9 is a flow diagram illustrating a method of conducting a test firing, in accordance with one illustrative embodiment. The method of conducting a test firing includes firing a test projectile 7042, activating a velocity gate 7044, receiving a timing signal 7046, activating a strobe light 7048 and recording an image of the test projectile 7050.

At step 1042, a test projectile is fired.

At step 1044, the test projectile passes through a velocity gate thereby activating the velocity gate. The velocity gate transmits a timing signal in the form of light detection pulses.

At step 1046, the gantry system 10 receives the timing signal from the velocity gate.

At step 1048, based on the timing signal, the gantry system 10 sequentially triggers infrared strobes as the projectile travels downrange. Each of these strobes illuminates the field of view for a camera pair of the camera system 20. In the embodiment shown in FIG. 1, the gantry system 10 comprises two strobes for each of the four camera pairs.

Figure 10:
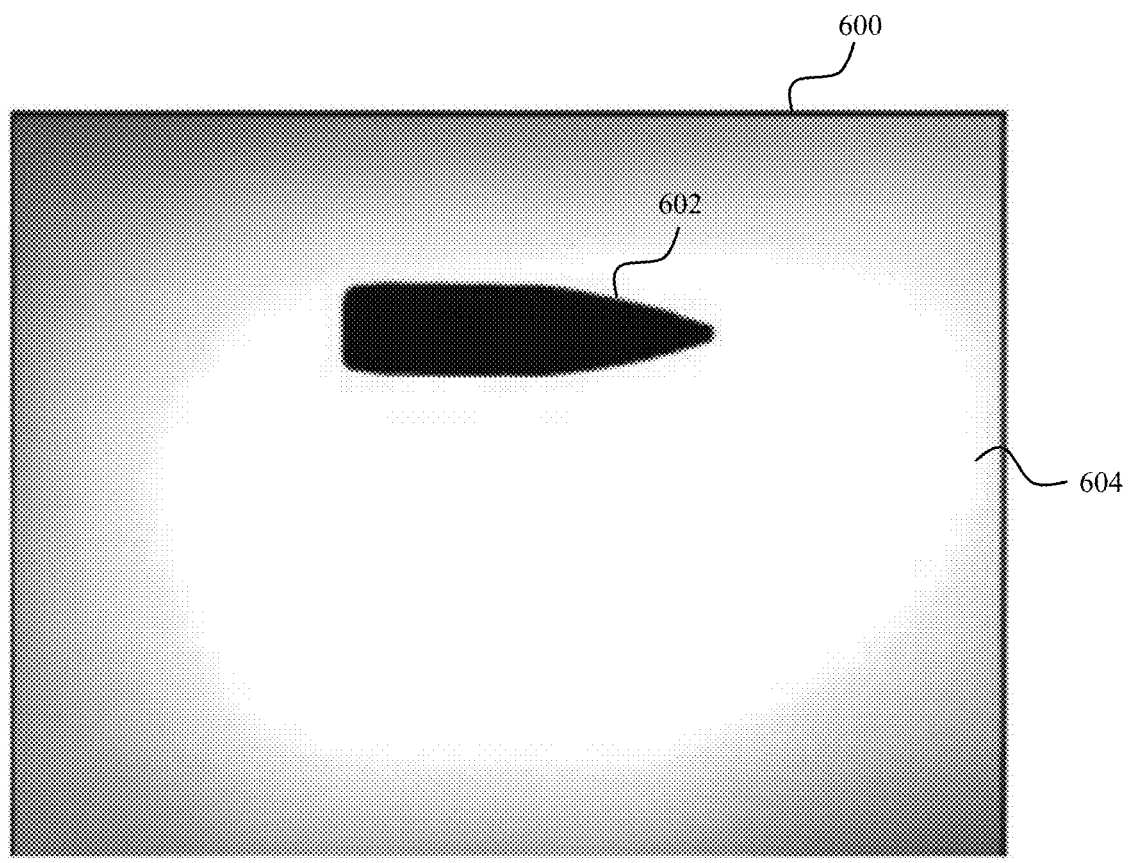
FIG. 10 shows a sample test image of a small arms projectile captured by one of the cameras of the gantry system.

At step 1050, during each strobe of infrared light, one camera pair of the camera system 20 captures a test image of the projectile. FIG. 10 shows a sample test image of a small arms projectile captured by one of the cameras 202 of the gantry system 10. The test image 600 comprises a high contrast image with a black outline of the projectile 602 on a white background 604. In the embodiment shown in FIG. 10, the image is captured at a resolution of 1360×1032 pixels.

Figure 11:
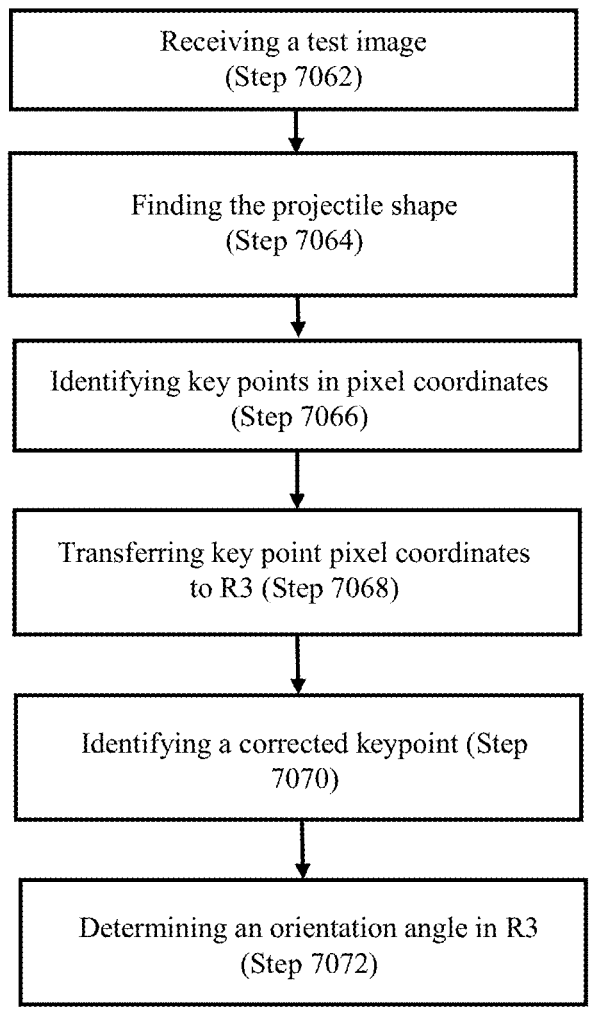
FIG. 11 is a flow diagram illustrating a method of measuring the orientation angle, in accordance with one illustrative embodiment.

FIG. 11 is a flow diagram illustrating a method of measuring the orientation angle, in accordance with one illustrative embodiment. The method of measuring the orientation angle of the test projectile 602 further comprises the steps of receiving a test image 7062, finding the projectile shape 7064, identifying keypoints of the projectile 602 in pixel coordinates 7066, transferring keypoint pixel coordinates to range coordinates 7068, resolving the R3 position of the keypoint using each pair of identified keypoints 7070 and determining an orientation angle in R3 7072.

At step 7062, the test images 600 are provided to the computing device 50. As described above, for each camera 202 in the camera system 20, the computing device 50 receives a test image 600 of the projectile 602 as it passes the field of view of that camera 202.

At step 7064, the projectile 602 shape is found in each of the test images 600. To identify keypoints 606 of the projectile 602, the computing device 50 segments a projectile shape in each of the test images 600, which allows the geometry and orientation of the projectile 602 to be calculated with sub-pixel accuracy. The projectile shape may be found using known shape finding techniques. For example, the projectile shape may be found using the shape finding technique disclosed by Decker et al. in co-owned U.S. Pat. No. 9,721,352, the entire contents of which are incorporated herein. This technique is described below in the context of the system described herein by reference.

It will be appreciated that the projectile discovery process extracts information from each test image 600 such as the projectile location, projectile orientation, nose location and base location in each image frame. During the discovery process, an Active Shape Model (ASM) data is used in finding the projectile shape, to verify the correct shape has been identified as described in more detail below.

Figure 12A:
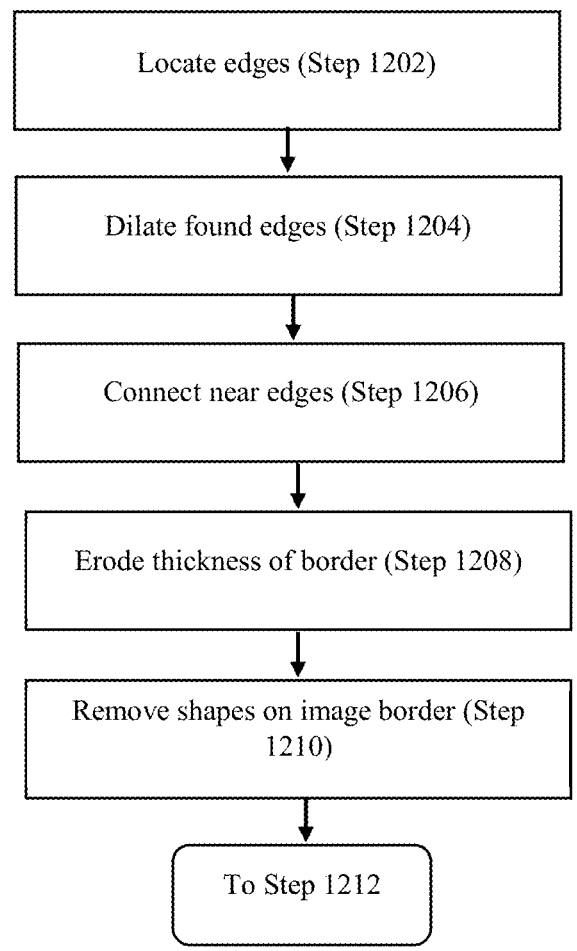
FIGS. 12A and 12B are flow diagrams illustrating a method of segmenting a test image, in accordance with an illustrative embodiment.
Figure 12B:
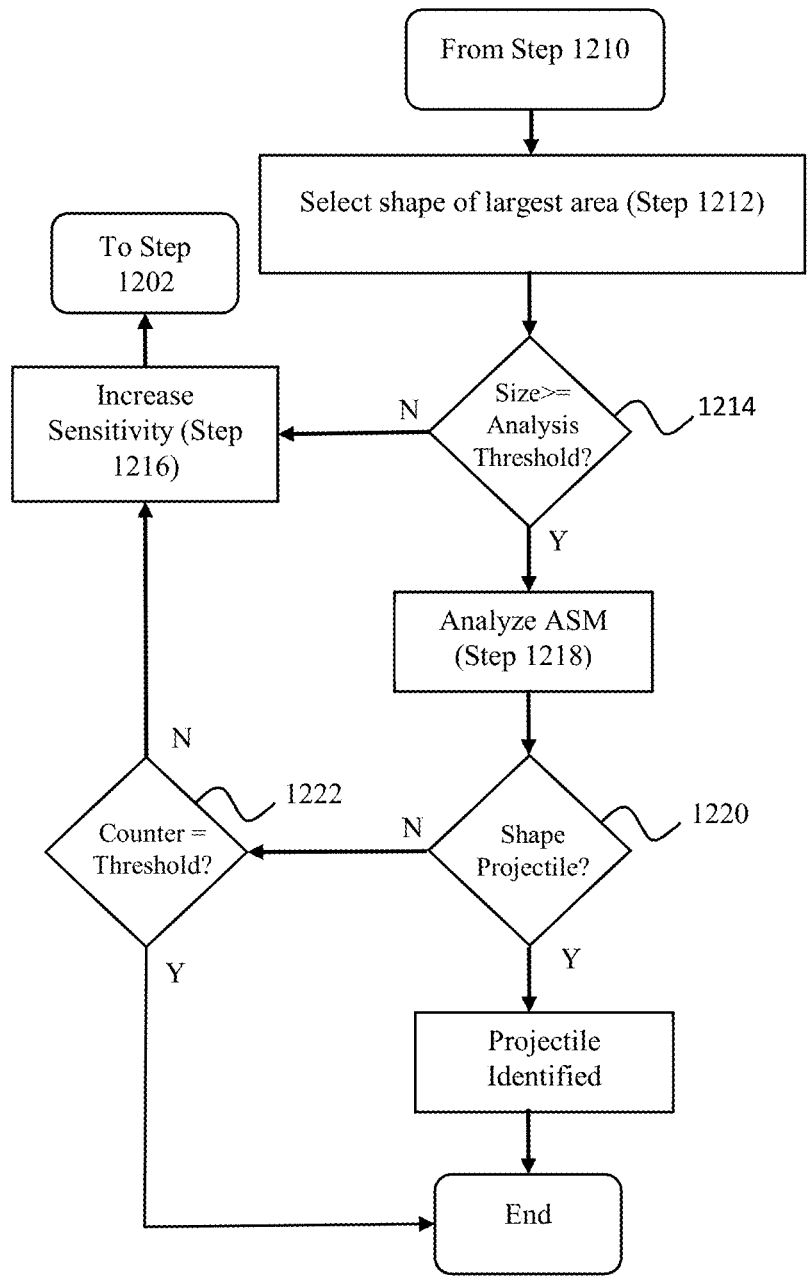

FIGS. 12A and 12B are flow diagrams illustrating a method of finding the projectile in a test image 600, in accordance with an illustrative embodiment. The method includes: locating a plurality of edges from the image frame 1202; dilating the plurality of edges 1204; connecting at least two of the plurality of the edges adjacent each other to define at least one shape 1206; eroding a thickness of a boundary of the at least one shape 1208; removing the at least one shape from a border of the image, the border being defined by the plurality of edges 1210; selecting a shape from the at least one shape having a largest area of the at least one shape 1212; determining when a size of the shape with the largest area is greater than or equal to a predefined sensitivity threshold 1214; repeating or reprocessing 1202-1214 when the size of the shape with the largest area is less than the predefined sensitivity threshold while increasing the sensitivity of the image until the size of the shape with the largest area is less than the predefined sensitivity threshold is greater than or equal to the predefined sensitivity threshold 1216; analyzing an active shape model of the shape with the largest area when the size of the shape with the largest area is greater than or equal to the predefined sensitivity threshold 1218; determining when the shape with the largest area is the projectile 602 from the test image 1220; determine the number of iterations of 1202-1220 have occurred when the shape with the largest area is determined not to be the projectile 602 and increasing the sensitivity of the image when the number of iterations of 1202-1220 is less than a predefined iteration threshold and ceasing segmenting the plurality of shapes of the projectile 602 from the image when the number of iterations of 1202-1220 is equal to the predefined iteration threshold 1222.

It will be appreciated that at step 1218, an active shape model of the shape with the largest area is analyzed when the size of the shape with the largest area is greater than or equal to the predefined sensitivity threshold. For example, when the largest candidate shape has an area greater than a predefined sensitivity threshold, the shape is compared to an Active Shape Model (ASM). An ASM is a numerical model used to represent natural shape variability of a training set of similar objects. When the candidate shape is within a threshold distance from the ASM, the pixel locations of that shape are classified as belonging to the projectile. In one example, the shape is analyzed for a corresponding ASM by fitting.

Figure 13:
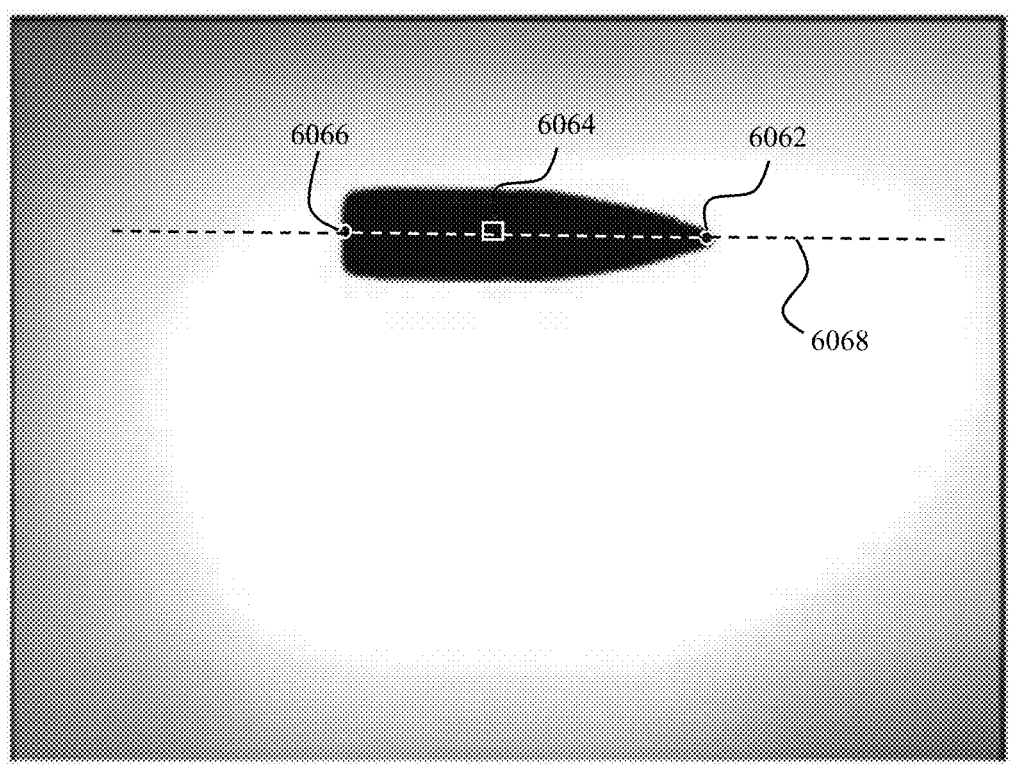
FIG. 13 shows a test image of a small arms projectile with keypoints identified, in accordance with one illustrative embodiment.

At step 7066, the keypoints 606 in each test image 600 are identified. FIG. 13 shows a test image of a small arms projectile 602 with keypoints 606 identified, in accordance with one illustrative embodiment. A nose 6062 of the projectile 602 is identified, the central moment 6064 is identified, a base 6066 of the projectile 602 is identified and an orientation line 6068 is identified.

Figure 14:
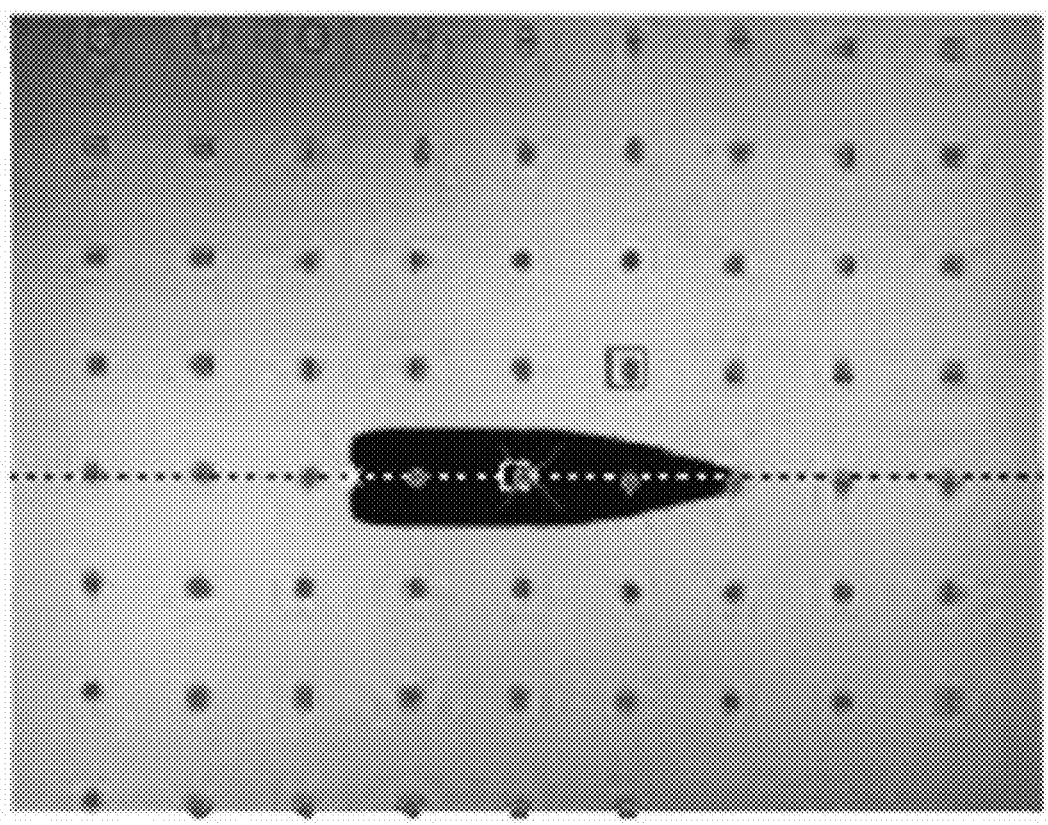
FIG. 14 is a test image of a small arms projectile projected onto the reference image of the calibration plate.

At step 7068, the keypoints 606 are transferred from image coordinates to R3 coordinates using a transform calculated from the calibration plate 306. FIG. 14 is a test image 600 of a small arms projectile 602 projected onto a calibration image of the calibration plate 306. As described above, the calibration plate 306 allows for a unique transform to be calculated for each camera 202 in the camera system 20 which allows conversion of points in pixel coordinates to R3 coordinates.

At step 7070, the R3 position of the keypoint is resolved using each pair of identified keypoints 606. Refer back to FIG. 3 which illustrates the projection of the resolved keypoint. For each range position, as there are two cameras 202 in a camera pair, two test images 600 exist. The data from these images may be combined to determine an accurate keypoint. Once a keypoint is determined in R3 for a test image, a vector can then be calculated from the camera's focal point to the individual keypoint. This vector may pass through the past location of the calibration plate 306. The R3 position of the resolved keypoint is determined to be the least-squares intersection of the two calculated vectors from the two orthogonal cameras 202 in the camera pair.

At step 7072, the orientation angle of the projectile 602 is determined in R3. In one embodiment, the orientation angle is estimated by subtracting the R3 projection of the projectile base or central moment from the R3 projection of the projectile nose. In another embodiment, the orientation vector of the test image 600 at the projectile central moment is projected into R3 plane.

This method has shown to be more accurate than estimating as the position of any keypoint is only known within a distance of one pixel. In the embodiment shown in FIGS. 1-4 and described throughout, one pixel corresponds to approximately 0.045 mm. The observed pitch angle in the test image 600, however, is measured based on the polar distribution of 100,000 pixels.

Figure 15:
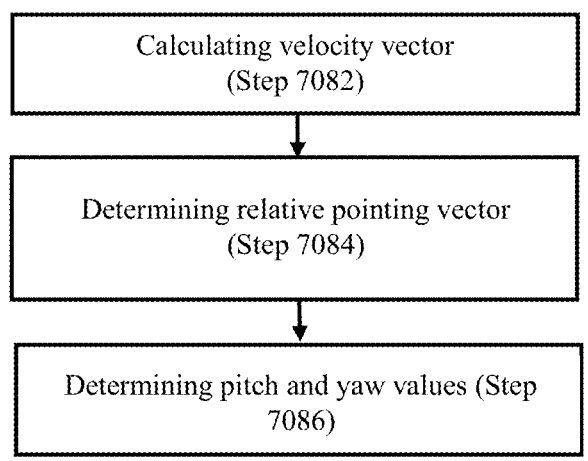
FIG. 15 is a flow diagram illustrating a method of fitting an aeroballistic model to the measured projectile.

FIG. 15 is a flow diagram illustrating a method of fitting an aeroballistic model to the measured projectile 602. The projectiles 602 resolved central moment location and orientation angle at each of the camera pairs are fit to a linearized aeroballistic model for the projectile 602. The method of fitting an aeroballistic model to the measured projectile 602 comprises the steps of calculating the projectiles velocity vector 7082, determining the relative pointing vector 7084 and determining the pitch and yaw values 7086.

At step 7082, the velocity vector of the projectile 602 is calculated. A straight line is fit through the resolved central moment locations in R3.

At step 7084, the relative pointing vector is determined for each camera pair. The relative pointing vector is determined by subtracting the velocity vector from each of the resolved orientation angle vectors.

At step 7086, measured pitch and measured yaw values are determined. The pitch and yaw values can then be calculated as:

$$\alpha_{pitch\ measured} = \tan^{-1}\left(\frac{P_{UP}}{P_{DR}}\right)$$

$$\beta_{yaw\ measured} = \tan^{-1}\left(\frac{P_{CR}}{P_{DR}}\right)$$

where the subscripts UP, DR, and CR correspond to the upward, downrange, and cross-range directions of the range coordinate system.

Figure 16:
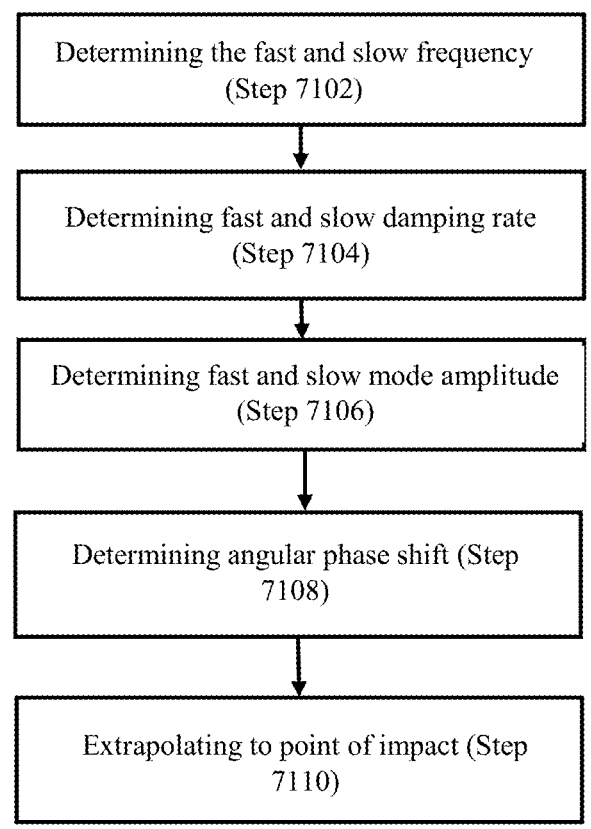
FIG. 16 is a flow diagram illustrating a method of determining an impact angle of the projectile.

FIG. 16 is a flow diagram illustrating a method of determining an impact angle of the projectile 602. The method of determining an impact angle further comprises the steps of determining the fast frequency and the slow frequency of the epicyclic motion 7102, determining the fast damping rate and the slow damping rate 7104, determining a fast mode amplitude and a slow mode amplitude 7106, determining an angular phase shift 7108 and extrapolating to the point of impact 7110.

For purposes of calculating pitch and yaw, it was assumed that the decrease in velocity due to drag is relatively minor in the span of flight captured within the gantry. Further it is also assumed that the fast and slow epicyclic oscillation rates are effectively constant within the zone of measurement.

The epicyclic oscillation magnitudes, however, can either be modelled as damped or undamped. In the case of damped oscillation, the expressions that describe the expected epicyclic pitch and yaw as a function of range are as follows:

$$\alpha_{pitch\ model} = K_F e^{-\lambda_F(x-x_0)}\cos(\phi_{F0}+\phi_F(x-x_0)) + K_S e^{-\lambda_S(x-x_0)}\cos(\phi_{S0}+\phi_S(x-x_0))$$

$$\beta_{yaw\ model} = K_F e^{-\lambda_F(x-x_0)}\sin(\phi_{F0}+\phi_F(x-x_0)) + K_S e^{-\lambda_S(x-x_0)}\sin(\phi_{S0}+\phi_S(x-x_0))$$

where (x-x0) is the distance traveled, $\phi_{F,S}$ represents the fast and slow frequencies (in deg/s) of the epicylcic motion and $\lambda_{F,S}$ represents the fast and slow damping rates (in deg/m).

At step 7102, the fast frequency and the slow frequency of the epicyclic motion are determined. At step 7104, the fast damping rate and the slow damping rate are determined. These values are determined from the projectile's aerodynamic and inertial characteristics in conjunction with the bullet spin rate. Such values may be generated using ballistics software such as PRODAS or acquired from a lookup table having a priori data, but can also be evaluated using spark-range testing. The flight velocity (measured from the velocity screen near the gantry) is used to determine the motion parameters from look-up tables compiled prior to testing.

At step 7106, fast mode amplitude and a slow mode amplitude are determined. At step 7108, an angular phase shift is determined. In the equation above, the variables Kf, Ks are the fast and slow mode amplitudes, which along with the angular phase shifts are determined by minimizing the error function:

$$error = \sqrt{(\alpha_{pitch\ measured} - \alpha_{pitch\ model})^2 + (\beta_{yaw\ measured} - \beta_{yaw\ model})^2}$$

which is evaluated using a solver. For example, the "fminsearch" function available in MATLAB may be utilized. To improve the chances of quickly finding an accurate solution, and may be determined using known approaches.

At step 7110, the impact conditions are determined by extrapolating the above equations to the point of impact.

Results of numerous tests conducted to determine the impact angle of small arms ammunition using the systems and methods described above show that the system and method are accurate to below 0.06 degrees. Comparable tests were conducted using conventional manual analysis of high speed camera images. The conventional tests resulted in an accuracy of approximately 1.9 degrees. Further, the conventional analysis required weeks to yield results. In comparison the system and methods described herein yielded results within minutes.

While the invention has been described with reference to certain embodiments, numerous changes, alterations and modifications to the described embodiments are possible without departing from the spirit and scope of the invention as defined in the appended claims, and equivalents thereof.

What is claimed is:

1. A method for determining an impact angle of a test projectile, the method comprising the steps of:
   calibrating a test system comprising
      a gantry defining an interior volume which encloses a portion of a line of fire of the test projectile, at least one pair of cameras mounted to the gantry having fields of view at an orthogonal angle relative to each other and wherein the fields of view comprise a portion of the line of fire, and a removable calibration bar holding a calibration plate in the field of view of each pair of the at least one pair of cameras;

conducting a test firing of the test projectile;

measuring an orientation angle of the test projectile;

fitting an aeroballistic model to the test projectile; and determining the impact angle of the projectile.

2. The method of claim 1 wherein the step of calibrating a test system further comprises the steps of:

inserting the removable calibration bar;

surveying extrema points on the gantry, on the at least one pair of cameras and on the removable calibration bar; and recording a calibration image of the calibration plate at each camera of the at least one pair of cameras.

3. The method of claim 2 wherein the extrema points on the gantry further comprise a top right corner of the gantry, a top left corner of the gantry, a middle right point on the gantry, a middle left point on a face of the gantry and a center of an uprange gantry face.

4. The method of claim 2 wherein the calibration plate further comprises a plurality of dots arranged in a grid and wherein one of the plurality of dots is dimensionally different.

5. The method of claim 2 wherein each calibration image comprises an image of a calibration plate.

6. The method of claim 2 further comprising the steps of:

identifying each of the plurality of dots in the calibration image; and calculating a transform between pixel coordinates and system coordinates based on the surveyed extrema points and identified plurality of dots.

7. The method of claim 6 wherein the step of identifying each of the plurality of dots in the calibration image further comprises using a Hough transform analysis to identify each of the plurality of dots in the calibration image.

8. The method of claim 1 wherein the step of conducting a test firing of a projectile further comprises the steps of:

firing a test projectile along the test projectile line of fire;

activating a velocity gate;

receiving a timing signal at the test system;

for each pair of cameras of the at least one pair of cameras, activating an infrared strobe light such that the infrared strobe illuminates the field of view of the pair of cameras while the test projectile is in the field of view of the camera;

recording a test image of the test projectile at each camera of the at least one pair of cameras.

9. The method of claim 1 wherein the step of measuring an orientation angle of the test projectile further comprises the steps of:

receiving a test image;

identifying the test projectile within the test image;

identifying a pixel coordinate of one or more keypoints of the test projectile;

transferring the pixel coordinate of the one or more keypoints of the test projectile to a system coordinate; and determining an orientation angle in system coordinates.

10. The method of claim 9 wherein the step of identifying the test projectile within the test image further comprises the steps of:

locating a plurality of edges from the test image;

dilating the plurality of edges;

connecting at least two of the plurality of the edges adjacent each other to define at least one shape;

eroding a thickness of a boundary of the at least one shape;

removing the at least one shape from a border of the image, the border being defined by the plurality of edges;

selecting a shape from the at least one shape having a largest area of the at least one shape;

determining when a size of the shape with the largest area is greater than or equal to a predefined sensitivity threshold;

analyzing an active shape model of the shape with the largest area when the size of the shape with the largest area is greater than or equal to the predefined sensitivity threshold; and determining when the shape with the largest area is the test projectile from the test image.

11. The method of claim 9 wherein the step of identifying a pixel coordinate of the one or more keypoints of the test projectile in pixel coordinates further comprises:

identifying a pixel coordinate of a nose of the test projectile;

identifying a pixel coordinate of a central moment of the test projectile; and identifying a pixel coordinate of a base of the test projectile.

12. The method of claim 9 wherein the step of transferring the pixel coordinates of one or more keypoints of the test projectile to system coordinates further comprises the step of determining a resolved keypoint coordinate.

13. The method of claim 12 wherein the step of determining a resolved keypoint coordinate further comprises the steps of:

receiving a first system coordinate of the keypoint for a first camera of a camera pair;

receiving a second system coordinate of the keypoint for a second camera of the camera pair;

calculating a first vector from a focal point of the first camera to the first system coordinate of the keypoint;

calculating a second vector from a focal point of the second camera to the second system coordinate of the keypoint;

determining a resolved keypoint coordinate as a least squares intersection of the first vector and the second vector.

14. The method of claim 1 wherein the step of fitting an aeroballistic model to the test projectile further comprises the steps of:

calculating a velocity vector of the test projectile;

determining a relative pointing vector of the test projectile;

determining a pitch value of the test projectile; and determining a yaw value of the test projectile.

15. The method of claim 1 wherein the step of determining an impact angle of the projectile further comprises the steps of:

determining a fast frequency of the test projectile;

determining a slow frequency of the test projectile;

determining a fast damping rate of the test projectile;

determining a slow damping rate of the test projectile;

determining a fast mode amplitude of the test projectile;

determining a slow mode amplitude of the test projectile;

determining an angular phase shift of the test projectile;

extrapolating the test projectile to a point of impact.

16. A system for determining the impact angle of a projectile, the system comprising:

a gantry having surveyed extrema points and defining an interior volume which encloses a portion of a line of fire of the test projectile, at least one pair of cameras mounted to the gantry having fields of view at an orthogonal angle relative to each other and wherein the fields of view comprise a portion of the line of fire, and a removable calibration bar holding a calibration plate in the field of view of each pair of the at least one pair of cameras;

a memory encoding one or more processor-executable instructions and a processor configured to load the one or more processor-executable instructions when encoded from the memory wherein the one or more processor-executable instructions, when executed by the processor, cause acts to be performed comprising determining an orientation angle of the projectile, applying an epicyclical model to the projectile, and determining an impact angle of the projectile.

17. The system of claim 16 wherein each calibration plate calibration plate further comprises a plurality of dots arranged in a grid and wherein one of the plurality of dots is dimensionally different.

18. The system of claim 16 wherein the one or more processor-executable instructions, when executed by the processor, cause acts to be performed comprising:
   receiving a test image;
   identifying the test projectile within the test image;
   identifying a pixel coordinate of one or more keypoints of the test projectile;
   transferring the pixel coordinate of the one or more keypoints of the test projectile to a system coordinate; and
   determining an orientation angle in system coordinates.

19. The system of claim 16 wherein the one or more processor-executable instructions, when executed by the processor, cause acts to be performed comprising:
   locating a plurality of edges from the test image;
   dilating the plurality of edges;
   connecting at least two of the plurality of the edges adjacent each other to define at least one shape;
   eroding a thickness of a boundary of the at least one shape;
   removing the at least one shape from a border of the test image, the border being defined by the plurality of edges;
   selecting a shape from the at least one shape having a largest area of the at least one shape;
   determining when a size of the shape with the largest area is greater than or equal to a predefined sensitivity threshold;
   analyzing an active shape model of the shape with the largest area when the size of the shape with the largest area is greater than or equal to the predefined sensitivity threshold; and
   determining when the shape with the largest area is the test projectile from the test image.

20. The system of claim 16 wherein the one or more processor-executable instructions, when executed by the processor, cause acts to be performed comprising:
   identifying a pixel coordinate of a nose of the test projectile;
   identifying a pixel coordinate of a central moment of the test projectile; and
   identifying a pixel coordinate of a base of the test projectile.

* * * * *